United States Patent
Ryu et al.

(10) Patent No.: US 6,582,501 B2
(45) Date of Patent: Jun. 24, 2003

(54) INK COMPOSITION FOR INK-JET PRINTERS

(75) Inventors: Seung-min Ryu, Kunpo (KR); Seung-soon Jang, Seoul (KR); Jun-hoe Cha, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 31 days.

(21) Appl. No.: 09/791,575

(22) Filed: Feb. 26, 2001

(65) Prior Publication Data
US 2002/0059884 A1 May 23, 2002

(30) Foreign Application Priority Data
Sep. 20, 2000 (KR) ........................................ 2000-55198

(51) Int. Cl.$^7$ .............................................. C09D 11/00
(52) U.S. Cl. ................ 106/31.46; 106/31.47; 106/31.49; 106/31.76; 106/31.77; 106/31.78; 106/31.57; 106/31.86
(58) Field of Search ............. 106/31.46, 31.47, 106/31.49, 31.58, 31.76, 31.77, 31.78, 31.86

(56) References Cited

U.S. PATENT DOCUMENTS

| | | | |
|---|---|---|---|
| 5,108,503 A | | 4/1992 | Hindagolla et al. ...... 106/31.47 |
| 5,173,112 A | * | 12/1992 | Matrick et al. .......... 106/31.43 |
| 5,205,861 A | | 4/1993 | Matrick ................... 106/31.47 |
| 5,223,026 A | * | 6/1993 | Schwarz, Jr. ............ 106/31.35 |
| 5,224,987 A | * | 7/1993 | Matrick ................... 106/31.43 |
| 5,324,349 A | | 6/1994 | Sano et al. ............... 106/31.25 |
| 5,421,871 A | | 6/1995 | Onishi et al. ............ 106/31.49 |
| 5,641,346 A | | 6/1997 | Mantell et al. .......... 106/31.58 |
| 5,679,724 A | | 10/1997 | Sacripante et al. ......... 523/161 |
| 5,690,723 A | | 11/1997 | Sano et al. ............... 106/31.75 |
| 5,704,969 A | | 1/1998 | Kanaya et al. ........... 106/31.48 |
| 5,858,075 A | | 1/1999 | Deardurff et al. ........ 106/31.27 |
| 5,876,491 A | * | 3/1999 | Gunn et al. .............. 106/31.46 |
| 5,936,008 A | | 8/1999 | Jones et al. ................. 523/161 |
| 5,969,033 A | | 10/1999 | Pearlstine et al. .......... 524/502 |
| 5,972,086 A | | 10/1999 | Kato et al. ............... 106/31.43 |
| 5,980,622 A | | 11/1999 | Byers ...................... 106/31.48 |
| 5,990,202 A | | 11/1999 | Nyuyen et al. ............. 523/201 |
| 6,025,412 A | | 2/2000 | Sacripante et al. ......... 523/161 |
| 6,039,796 A | | 3/2000 | Kubota et al. ............. 106/31.6 |
| 6,057,384 A | | 5/2000 | Nguyen et al. ............. 523/160 |
| 6,095,645 A | | 8/2000 | Owatari et al. ............. 347/105 |
| 6,179,906 B1 | * | 1/2001 | Marsella et al. ....... 106/287.21 |
| 6,231,654 B1 | * | 5/2001 | Elwakil ................... 106/31.47 |
| 6,436,178 B1 | * | 8/2002 | Hosmer ................... 106/31.46 |
| 2002/0050226 A1 | * | 5/2002 | Oki et al. ................. 106/31.46 |

FOREIGN PATENT DOCUMENTS

EP 1088860 A1 * 4/2001 ........... C09D/11/00

* cited by examiner

*Primary Examiner*—Helene Klemanski
(74) *Attorney, Agent, or Firm*—Robert E. Bushnell, Esq.

(57) ABSTRACT

An ink composition for ink-jet printers is provided which includes a chromophore, a solvent, a co-solvent, a humectant, a surfactant, a viscosity adjuster and an additive. The additive is a nitrogen-containing heterocyclic compound. This nitrogen-containing heterocyclic compound has the hydroxy groups which improve miscibility with water, thereby preventing clogging of nozzles during use. The present invention increases the affinity for dye used as a chromophore and for the hydroxy groups of paper after discharging of ink, which allows the chromophore to easily fix on the paper, thus enhancing smearfastness of the ink composition after printing.

43 Claims, No Drawings

INK COMPOSITION FOR INK-JET PRINTERS

CLAIM OF PRIORITY

This application makes reference to, incorporates the same herein, and claims all benefits accruing under 35 U.S.C. §119 from an application for INK COMPOSITION FOR INK-JET PRINTERS earlier filed in the Korean Industrial Property Office on the of Sep. 22, 2000 and there duly assigned Ser. No. 00-55198.

BACKGROUND OF THE INVENTION

1. Field of the Invention

The present invention relates to an ink composition for ink-jet printers which can be effectively used with dyes or pigments and which is easy to fix and has excellent water-fastness (water resistance) and smearfastness (smear resistance) after printing, and has good storage stability and excellent wetness at nozzles (anti-clogging of nozzles).

2. Description of the Related Art

Ink-jet printing, a type of non-impact printing, produces less noise than that produced by impact printing, and it is easier to implement color printing by the ink-jet printing technique than by a laser beam printing technique. The major types of non-impact printing processes include a continuous inkjet process and a drop-on-demand (DOD) process. In continuous inkjet processes, the direction of jetting is adjusted by changing the electric field during continuous jetting of ink. DOD processes, which expel droplets of ink for printing, include thermal-bubble ink jet processes and piezoelectric ink jet processes. As for thermal-bubble ink jet processes, a bubble of ink vapor is created by heating and is substantially expelled due to the resultant increase in pressure. In contrast, piezoelectric ink jet processes adopt a piezoelectric oscillator to generate pressure required to expel the ink. The piezoelectric oscillator deforms by the application of electricity, thereby producing pressure to discharge the ink.

On the other hand, ink-jet ink compositions basically include a chromophore as a colorant, and a vehicle. Ink-jet ink compositions for color printing should have physical properties suitable for a printing device and should be easily fixed or absorbed onto a target recording medium, so as to produce a desired print. In particular, the following conditions are generally required for ink-jet ink compositions, and the compositions include a variety of components:

(1) the ink composition should have a proper viscosity and surface tension, so as to produce a high optical density, a high dot uniformity and a high jetting stability.

(2) the ink composition should dry rapidly with minimal color-to-color bleed (3) the ink composition should have good storage stability.

(4) the ink composition should have good color characteristics for properties such as hue, lightness and saturation.

(5) the ink composition should be attractive to a printer head or a recording medium such as paper or overhead projector film. That is, it should have the properties of smearfastness and waterfastness.

Many approaches have been taken to develop an ink composition with improved performance, as may be seen in U.S. Pat. Nos. 5,108,503, 5,858,075, 5,980,622, 5,990,202, 6,057,384, 5,641,346, 5,679,724, 5,936,008, 5,969,033, 6,025,412, 5,324,349, 5,421,871, 5,690,723, 5,704,969, 5,972,086, 6,039,796, and 6,095,645. A method of improving the storage stability and wetness at nozzles of the ink composition and the drying time after discharging of the ink has been disclosed using a variety of nitrogen-containing heterocyclic compounds, such as 2-pyrrolidone, N-methyl-2-pyrrolidone, 1,3-dimethyl-2-imidazolidinone. The above-listed disclosures, which utilize nitrogen-containing heterocyclic compounds, such as 2-pyrrolidone, N-methyl-2-pyrrolidone and 1,3-dimethyl-2-imidazolidinone, explain the reasons for the improvements in storage stability, wetness at nozzles and drying time as follows.

Nitrogen-containing heterocyclic compounds have a stronger dipole moment than water. Thus, such compounds are miscible with water at the molecular level through dipole—dipole interaction with water. However, the nitrogen-contained heterocyclic compounds have a stronger affinity than water for the functional groups of a chromophore, or coloring agent, contained in ink compositions, which enables the chromophore to dissolve in the composition, so that the chromophore can remain dispersed without aggregation and precipitation of the chromophore when the ink composition is preserved in a cartridge.

On the other hand, when the nozzle of an ink jet printer is exposed to the air, the nozzle can be clogged due to evaporation of volatile components from the ink composition, which causes clogging and thus a problem in discharging ink through the nozzle occurs. To avoid the problem of clogging, some degree of wetness is required for the ink composition. At the same time, the ink composition should dry rapidly, such that less color-to-color bleeding and smearing occur after jetting. Consistent with these requirements, the nitrogen-contained heterocyclic compound is hydrophilic and has a low vapor pressure, which prevents the evaporation of water. As a result, the nozzle can be kept wet even when the nozzle is exposed to the air for a longer period of time, thereby preventing clogging of the nozzle. In addition, a low surface tension of the nitrogen-contained heterocyclic compound allows easy penetration of droplets of ink into porous paper, thereby facilitating drying of the ink on paper.

However, the disclosed ink compositions provide an improved storage stability, wetness at nozzles, and fast-drying property only when a dye is added as a chromophore. Here, "dye" refers to a water-soluble chromophore, and "pigment" to a water-insoluble chromophore. As for pigment-based ink compositions, the storage stability is less improved. This is because the pigment contains a small number of hydrophilic functional groups, compared with the dye, thus hindering a stable reaction with the existing nitrogen-contained heterocyclic compound. As for dye-based ink compositions, waterfastness and smearfastness after printing are still unsatisfactory, thereby degrading the quality of print.

SUMMARY OF THE INVENTION

It is therefore an object of the present invention to provide an improved ink composition for ink-jet printers.

It is another object of the invention to provide an ink having improved storage stability.

It is a further object of the invention to provide an ink having wetness at nozzles.

It is a yet further object of the invention to provide an ink having excellent waterfastness (water resistance) and smearfastness (smear resistance) after jetting, either when a dye or a pigment is used as a chromophore.

To achieve the objective of the present invention, there is provided an ink composition for ink-jet printers, comprising a chromophore, a solvent, a co-solvent, a humectant, a surfactant, a viscosity adjuster, and an additive, wherein the additive is a nitrogen-containing heterocyclic in compound having formula:

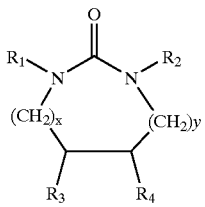
(1)

where each of $R_1$ and $R_2$ is independently selected from —$CH_2OH$, —$CH_2CH_2OH$, —$CH_2CH(OH)(CH_2)_{n1}CH_3$ (n1 is an integer from 1 to 5), —$CH_2CH(OH)(CH_2)_{n2}OH$ (n2 is an integer from 1 to 6), —$CH_2CH(OH)(CH_2)_{n3}NH_2$ (n3 is an integer from 1 to 6), —$CH_2CH_2O(CH_2CH_2O)_{n4}CH_2CH_2OH$ (n4 is an integer from 1 to 10), —$CH_2CH(OH)(CH_2CH_2O)_{n5}CH_2CH_2OH$ (n5 is an integer from 1 to 10), —$CH_2CH(OH)(CH_2CH_2NH)_{n6}CH_2CH_2OH$ (n6 is an integer from 1 to 9), —$CH_2CH(OH)(CH_2CH(OH))_{n7}CH_2CH_2OH$ (n7 is an integer from 1 to 10), —$CH_2CH(OH)(CH_2CH(CN))_{n8}CH_2CH_2OH$ (n8 is an integer from 1 to 10), —$CH_2CH(OH)(CH_2CH(COONH_2))_{n9}CH_2CH_2OH$ (n9 is an integer from 1 to 10) or —$CH_2CH(OH)(CH_2CH(COO(CH_2)_mNH_2))_{n10}CH_2CH_2OH$ (n10 is an integer from 1 to 10, and m is an integer from 1 to 5);

where x and y are integers and ($0 \leq x+y \leq 8$); and where each of $R_3$ and $R_4$ is independently selected from —H, —$CH_3$, —$CH_2OH$, —$CH_2CH_2OH$, —$CH_2CH(OH)(CH_2)_{n1}CH_3$ (n1 is an integer from 1 to 5), —$CH_2CH(OH)(CH_2)_{n2}OH$ (n2 is an integer is from 1 to 6), —$CH_2CH(OH)(CH_2)_{n3}NH_2$ (n3 is an integer from 1 to 6), —$CH_2CH_2O(CH_2CH_2O)_{n4}CH_2CH_2OH$ (n4 is an integer from 1 to 10), —$CH_2CH(OH)(CH_2CH_2O)_{n5}CH_2CH_2OH$ (n5 is an integer from 1 to 10), $CH_2CH(OH)(CH_2CH_2NH)_{n6}CH_2CH_2OH$ (n6 is an integer from 1 to 9), —$CH_2CH(OH)(CH_2CH(OH))_{n7}CH_2CH_2OH$ (n7 is an integer from 1 to 10), —$CH_2CH(OH)(CH_2CH(CN))_{n8}CH_2CH_2OH$ (n8 is an integer from 1 to 10), —$CH_2CH(OH)(CH_2CH(COONH_2))_{n9}CH_2CH_2OH$ (n9 is an integer from 1 to 10) and —$CH_2CH(OH)(CH_2CH(COO(CH_2)_mNH_2))_{n10}CH_2CH_2OH$ (n10 is an integer from 1 to 10, and m is an integer from 1 to 5).

The above object and advantages of the present invention will become more apparent by describing in detail preferred embodiments thereof.

DESCRIPTION OF THE PREFERRED EMBODIMENTS

Use of a nitrogen-containing heterocyclic compound having formula (1) as an additive provides the following effects. First, the hydroxy groups of $R_1$, $R_2$, $R_3$ and $R_4$ improve miscibility with water, thereby preventing clogging of nozzles during use. Second, the nitrogen containing substitutents of $R_1$, $R_2$, $R_3$ and $R_4$ increase the affinity for dye used as a chromophore and for the hydroxy groups of paper after discharging of ink, which allows the chromophore to easily fix on the paper, thus enhancing smearfastness of the ink composition after printing. Third, when a pigment is used as a chromophore, the inventive nitrogen containing heterocyclic compound has a greater affinity for the pigment than conventional nitrogen containing heterocyclic compounds do, which contributes to easy dispersion of the pigment in conjunction with a dispersing agent. As a result, the storage stability and wetness at nozzles of the ink composition before jetting, and drying efficiency after jetting can be improved even for pigment-based ink compositions.

Preferably, the amount of the additive of formula (1) is in the range of 0.1–10 parts by weight based on 100 parts by weight ink composition, that is in the range of 0.1 to 10 weight-% of the ink composition. The additive may be in the range of 2.0 to 6.0 parts by weight based on 100 parts of the ink composition. If the amount of the additive exceeds 10 parts by weight, the surface tension of the ink composition is so weak that the ink composition penetrates further into the surface of paper, resulting in less acceptable prints having a unclear color tone. If the amount of the additive is less than 0.1 parts by weight, the storage stability improving effect is negligible.

The ink composition according to the present invention can be combined with both dye and pigment. Any dye and pigment available for ink compositions can be used without limitations. Suitable dyes include C.I. Direct Black 9, 17, 22, 32, 51, 56, 91, 94, 97, 166,168, 173 and 199; C.I. Direct Blue 1, 10, 15, 22, 77, 78, 80, 200, 201, 202, 203, 207 and 211; C.I. Direct Red 2, 4, 9, 23, 31, 39, 63, 72, 83, 84, 89, 111, 173, 184 and 240; C.I. Direct Yellow 8, 9, 11, 12, 27, 28, 33, 35, 41, 44, 50, 53 and 58. Suitable pigments include carbon black, graphite, vitreous carbon, activated charcoal, activated carbon, anthraquinone, phthalocyanine blue, phthalocyanine green, diazo pigments, monoazo pigments, pyranthrones, perylene, quinacridone, and indigoid pigments. The amount of chromophore in the ink composition may be in the range of 1.0–10.0 parts by weight based on 100 parts by weight ink composition. If the amount of chromophore is less than 1.0 parts by weight, the optical density of resultant prints is very low. In contrast, if the amount of chromophore exceeds 10.0 parts by weight, the viscosity is too high to jet droplets of ink onto the surface of recording media.

The humectant serves to prevent clogging of the nozzles. A polyhydric alcohol can be used as the humectant. For example, the humectant may include glycerine, ethylene glycol, diethylene glycol, triethylene glycol, propylene glycol, dipropylene glycol, hexylene glycol, 1,3-butanediol, 1,4-butanediol, 1,5-pentanediol, 2-butene-1,4-diol, 2-methyl-2-pentanediol and a mixture of these alcohols. Preferably, the amount of humectant is in the range of 0.1–20.0 parts by weight based on 100 parts by weight ink composition. The amount of humectant may be in the range of 4 to 15 parts by weight. If the amount of humectant exceeds 20.0 parts by weight, the viscosity of the ink composition highly increases, so the ink composition is unsuitable for inkjet printing. If the amount of humectant is less than 0.1 parts by weight, clogging of the nozzles frequently occurs due to evaporation of volatile components from the ink composition.

The surfactant contained in the inventive ink composition serves to adjust the surface tension of the ink composition, which ensures smooth jetting of the ink through nozzles. An anionic surfactant or a nonionic surfactant can be used. Suitable anionic surfactants include an alkylcarboxylic acid salt of 1 to 1,000 carbon atoms, but preferably of 10–200 carbon atoms, an alcohol sulfonic acid ester salt of 1 to 1,000 carbon atoms, but preferably of 10–200 carbon atoms, an alkyl sulfonic acid salt of 1–1,000 carbon atoms, but preferably of 10–200 carbon atoms, an alkylbenzene sulfonic acid salt of 1 to 1,000 carbon atoms, but preferably of 10–200 carbon atoms, or a mixture of these salts. Suitable nonionic surfactants include polyoxyethylene alkyl ether having an alkyl group of 1–1,000 carbon atoms, but preferably of 10–200 carbon atoms, polyoxyethylene alkylphenyl ether having an alkyl group of 1–1,000 carbon atoms, but preferably of 10–200 carbon atoms, polyoxyethylene secondary alcohol ether, polyoxyethylene-oxypropylene block copolymer, polyglycerin fatty acid ester, sorbitan fatty acid ester and a mixture of these materials.

The polyoxide series materials used as the surfactant have a chemical structure similar to that of glycol series materials, and thus they can serve as an evaporation inhibitor, thereby preventing clogging of nozzles caused by evaporation of volatile components. Preferably, the amount of surfactant is in the range of 0.1–10.0 parts by weight based on 100 parts by weight ink composition. The amount of surfactant may be in the range of 3 to 6 parts by weight based on 100 parts ink composition. If the amount of surfactant exceeds 10.0 parts by weight, the viscosity of the composition is too thick to jet through nozzles. If the amount of surfactant is less than 0.1 parts by weight, the surface tension adjusting effect does not appear.

The viscosity adjuster serves to adjust the viscosity of the composition to ensure smooth jetting of the composition. The viscosity adjuster may be polyvinyl alcohol, casein or carboxymethylcellulose (CMC). Preferably, the amount of viscosity adjuster is in the range of 0.1–5.0 parts by weight based on 100 parts by weight ink composition. If the amount of viscosity adjuster exceeds 5.0 parts by weight, the viscosity of the composition increases, so that smooth jetting of the ink composition is not ensured. If the amount of viscosity adjuster is less than 0.1 parts by weight, a large amount of the ink composition is expelled during a jetting, which is undesirable in terms of the print quality.

As the solvent for dissolving the additive, the humectant, the viscosity adjuster and the surfactant, water is used in an amount of 34.0–97.6 parts by weight based on 100 parts by weight ink composition. In addition, the co-solvent contained in the inventive ink composition may be an alcohol, such as methanol, ethanol, isopropanol, butanol, pentanol or the like. Because paper is highly permeable to the alcohol, the properties of the solvent serving as a carrier can be enhanced by the co-solvent. The alcohol is more volatile than water, so that the resultant prints can be rapidly dried. Preferably, the amount of co-solvent is in the range of 1.0–20.0 parts by weight based on 100 parts by weight ink composition. If the amount of co-solvent exceeds 20.0 parts by weight, due to quick drying of the composition, the nozzles become clogged. If the amount of co-solvent is less than 1.0 part by weight, bleeding of printing occurs due to a longer period of drying time, thereby degrading the quality of resultant printing.

A method for preparing the ink-jet ink composition mentioned above will be described. First, an additive, a viscosity adjuster, a surfactant and a humectant are added to a solvent and mixed. The mixture is stirred sufficiently in a mixer at a temperature of 50–80° C. to obtain a uniform mixture. Keeping the mixing temperature in the range of 50–80° C. ensures production of a uniform and chemically stable mixture. The temperature may be maintained in the range of 60 to 70° C. If the temperature of the mixture during mixing is lower than 50° C., a slight phase separation occurs, thereby resulting in a nonuniform mixture. If the temperature of the mixture is higher than 80° C., it is difficult to obtain a chemically stable mixture due to vigorous molecular movement.

Next, the temperature of the mixture is reduced to a temperature of 30–40° C., and a chromophore and a co-solvent are added to the mixture and stirred. The reason for the reduction of the temperature to 30–40° C. is to condition the mixture such that neither evaporation of the alcohol nor phase separation occurs. Next, the resultant mixture is filtered, so that an ink-jet ink composition according to the present invention is obtained.

As a result of quantum mechanics modeling, which was carried out to estimate the effect of 1,3-bis(hydroxymethyl)-2-imidazolidinone, which is a nitrogen-containing heterocyclic compounds having formula (1) above, as an additive of the invention relative to a conventional storage stability improver, N-methyl-2-pyrrolidone, an improved storage stability was expected for the inventive ink composition due to good miscibility of the inventive additive with water. This expected result is verified by the following Examples and Comparative Examples.

The present invention will be described in greater detail by means of the following examples. The following examples are for illustrative purposes and are not intended to limit the scope of the invention.

EXAMPLE 1

3 parts by weight ethanol, 5 parts by weight glycerine, 0.2 parts by weight polyoxyethylene ethylether, 0.2 parts by weight poly(vinylalcohol) and 1 part by weight 1,3-bis(hydroxymethyl)-2-imidazolidinone were mixed in a mechanical stirrer at a temperature of 50–80° C. for 1 hour to obtain a uniform mixture.

The temperature of the mixture was dropped to a temperature of 30–40° C., and 3 parts by weight C.I. Direct-Black 168 and 87.6 parts by weight distilled water were added to the mixture and further stirred for 1 hour. The resultant mixture was filtered through a membrane filter having a 0.42-$\mu$m pore size, thereby resulting in an ink composition.

EXAMPLE 2

An ink composition was prepared in the same way as in Example 1, except that 2 parts by weight 1,3-bis(hydroxymethyl)-2-imidazolidinone and 86.6 parts by weight distilled water were added.

EXAMPLE 3

An ink composition was prepared in the same way as in Example 1, except that 3 parts by weight 1,3-bis(hydroxymethyl)-2-imidazolidinone and 85.6 parts by weight distilled water were added.

EXAMPLE 4

An ink composition was prepared in the same way as in Example 1, except that carbon black instead of C. I. Direct Black 168 was used, 0.5 parts by weight polyoxyethylene ethylether, 4 parts by weight 1,3-bis(hydroxymethyl)-2-imidazolidinone and 84.3 parts by weight distilled water were added.

EXAMPLE 5

An ink composition was prepared in the same way as in Example 4, except that 5 parts by weight 1,3-bis(hydroxymethyl)-2-imidazolidinone and 83.6 parts by weight distilled water were added.

EXAMPLE 6

An ink composition was prepared in the same way as in Example 4, except that 6 parts by weight 1,3-bis (hydroxymethyl)-2-imidazolidinone and 82.6 parts by weight distilled water were added.

EXAMPLE 7

An ink composition was prepared in the same way as in Example 1, except that 1 part by weight 1,3-bis (hydroxymethyl)-2-imidazolidinone was replaced by 2 parts by weight the nitrogen containing heterocyclic compound having formula (1) above, where x and y are 0, $R_1$, $R_2$, $R_3$ and $R_4$ are all —$CH_2CH_2OH$, and 86.6 parts by weight distilled water was added.

EXAMPLE 8

An ink composition was prepared in the same way as in Example 7, except that the nitrogen containing heterocyclic compound having formula (1) above, where x and y are 0, and $R_1$, is $R_2$, $R_3$ and $R_4$ are all —$CH_2CH(OH)CH_2CH_2OH$, was used.

EXAMPLE 9

An ink composition was prepared in the same way as in Example 7, except that the nitrogen containing heterocyclic compound having formula (1) above, where x and y are 0, both $R_1$, and $R_2$ are —$CH_2CH_2OH$, and both $R_3$ and $R_4$ are —$CH_2CH(OH)(CH_2CH_2O)_2CH_2CH_2OH$, was used.

EXAMPLE 10

An ink composition was prepared in the same way as in Example 7, except that the nitrogen-containing heterocyclic compound having formula (1) above, where x and y are 0, where both $R_1$ and $R_2$ are —$CH_2CH_2OH$, and both $R_3$ and $R_4$ are —$CH_2CH(OH)CH_2CH_2NH$, was used.

EXAMPLE 11

An ink composition was prepared in the same way as in Example 7, except that the amount of nitrogen-containing heterocyclic compound having formula (1) above, where x and y are 0 and $R_1$, $R_2$, $R_3$, and $R_4$ are all —$CH_2CH_2OH$, was increased to 4 parts by weight, and the amount of distilled water was reduced to 84.6 parts by weight.

EXAMPLE 12

An ink composition was prepared in the same way as in Example 8, except that the amount of nitrogen-containing heterocyclic compound having formula (1) above, where x and y are 0 and $R_1$, $R_2$, $R_3$ and $R_4$ are all —$CH_2CH(OH)CH_2CH_2OH$, was increased to 4 parts by weight, and the amount of distilled water was reduced to 84.6 parts by weight.

EXAMPLE 13

An ink composition was prepared in the same way as in Example 9, except that the amount of nitrogen-containing heterocyclic compound having formula (1) above, where x and y are 0, both $R_1$ and $R_2$ are —$CH_2CH_2OH$, and both $R_3$ and $R_4$ are —$CH_2CH(OH)(CH_2CH_2O)_2CH_2CH_2OH$, was increased to 4 parts by weight, and the amount of distilled water was reduced to 84.6 parts by weight.

EXAMPLE 14

An ink composition was prepared in the same way as in Example 10, except that the amount of nitrogen containing heterocyclic compound having formula (1) above, where x and y are 0, both $R_1$ and $R_2$ are —$CH_2CH_2OH$, and both $R_3$ and $R_4$ are —$CH_2CH(OH)CH_2CH_2NH$, was increased to 4 parts by weight, and the amount of distilled water was reduced to 84.6 parts by weight.

COMPARATIVE EXAMPLES 1 THROUGH 3

The processes of Examples 1 through 3 were followed to prepare ink compositions for Comparative Examples 1 through 3, respectively, except that 1,3-bis(hydroxymethyl)-2-imdazolidinone was replaced by N-methyl-2-pyrrolidone.

COMPARATIVE EXAMPLES 4 THROUGH 6

The processes of Examples 4 through 6 were followed to prepare ink compositions for Comparative Examples 4 through 6, respectively, except that 1,3-bishydroxymethyl)-2-imidazolidinone was replaced by N-methyl-2-pyrrolidone.

Properties of the ink compositions prepared in Examples 1 through 14, and Comparative Examples 1 through 6 was evaluated by the following methods.

(1) Storage Stability 100 ml of the respective ink compositions was put in a heat-resistant glass bottle, sealed, and stored in an incubation room set at a temperature of 0–60° C. The ink compositions were left in the incubation room for 2 months, and printing was performed with the respective ink composition. Then, the storage stability was rated as having one of the two grades:

○: no failure was detected during printing.

x: printing was not smoothly performed or the ink composition was changed.

(2) Optical Density

The average optical density of the prints obtained using the respective ink compositions was measured using an optical density measuring device (TR-1224, manufactured by Macbeth Co.). The optical density was rated as having one of three grades:

○: the average optical density was greater than 1.0,

Δ: the average optical density was in the range of 0.9–1.0, x: the average optical density was less than 0.9.

(3) Waterfastness

After 1 hour lapsed from the printing, the resultant print obtained with the respective ink compositions was immersed in water, so as to measure the degree of dissolving of the compositions in water. The optical density variations before and after the dipping in water were measured. Then, the waterfastness was rated as having one of three grades:

○: the variation of optical densities was less than 10%,

Δ: the variation of optical densities was about 10–30%, x: the variation of optical densities was greater than 30%.

(4) Smearfastness

After 1-hour lapse from the printing, the resultant print obtained with the respective ink compositions was rubbed with fingers wearing a latex examination glove (manufactured by Fisher Scientific Co.), so as to investigate whether the prints smeared by the rubbing. The smearfastness was rated as having one of three grades.

○: no smearing occurred,

Δ: slight smearing occurred, x: serious smearing occurred.

(5) Jettability

The respective ink compositions were put in an ink cartridge of a conventional ink-jet printer, and printing was carried out to investigate whether the ink composition was smoothly discharged through nozzles for printing. Then, the jettability was rated as having one of two grades:
  o: ink composition was smoothly discharged for printing,
  x: printing could not be performed due to clogging of the nozzles.

The results of the above measurements on the properties of the ink compositions prepared in Examples 1 through 14 and Comparative Examples 1 through 6 are shown in Table 1.

TABLE 1

| Example | Storage Stability | Optical Density | Water-fastness | Smearfastness | Jettability |
|---|---|---|---|---|---|
| Example 1 | o | o | o | o | o |
| Example 2 | o | o | o | o | o |
| Example 3 | o | o | o | o | o |
| Example 4 | o | o | o | o | o |
| Example 5 | o | o | o | o | o |
| Example 6 | o | o | o | o | o |
| Example 7 | o | o | o | o | o |
| Example 8 | o | o | o | o | o |
| Example 9 | o | o | o | o | o |
| Example 10 | o | o | o | o | o |
| Example 11 | o | o | o | o | o |
| Example 12 | o | o | o | o | o |
| Example 13 | o | o | o | o | o |
| Example 14 | o | o | o | o | o |
| Comparative Example 1 | x | o | Δ | x | o |
| Comparative Example 2 | Δ | o | Δ | Δ | o |
| Comparative Example 3 | o | Δ | Δ | o | o |
| Comparative Example 4 | x | o | Δ | x | o |
| Comparative Example 5 | Δ | o | Δ | x | o |
| Comparative Example 6 | Δ | Δ | Δ | Δ | o |

As shown in Table 1, when 1,3-bis(hydroxymethyl)-2-imidazolidinone is used as an additive, the storage stability, the waterfastness and the smearfastness are excellent compared with the ink compositions containing N-methyl-2-pyrrolidone as a storage stability improver (Comparative Examples 1 through 6), irrespective of whether a dye (Examples 1 through 3) or a pigment (Examples 4–6) is used as a chromophore. As for the ink compositions prepared in Examples 7 through 14, where the nitrogen containing heterocyclic compounds having formula (1) above are used as an additive, wherein in formula (1), x and y are 0, and $R_1$, $R_2$, $R_3$ and $R_4$ are all —$CH_2CH_2OH$ or —$CH_2CH(OH)CH_2CH_2OH$, both $R_1$ and $R_2$ are —$CH_2CH_2OH$ and both $R_3$ and $R_4$ are —$CH_2CH(OH)(CH_2CH_2O)_2CH_2CH_2OH$, or both $R_1$ and $R_2$ are —$CH_2CH_2OH$ and both $R_3$ and $R_4$ are —$CH_2CH(OH)CH_2CH_2NH$, the storage stability, the waterfastness and the smearfastness are improved just as for Examples 1 through 6.

As previously mentioned, the ink composition according to the present invention can remain even for a longer period of storage when a pigment is used as a chromohphore, as well as when a dye is used. In addition, the bleeding of prints due to a long time of drying can be prevented. In other words, the ink composition according to the present invention has excellent storage stability, wetness at nozzles during use, and provides good drying characteristic, waterfastness and smearfastness after printing.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An ink composition, comprising:
   a solvent;
   a co-solvent;
   a humectant;
   a surfactant;
   a viscosity adjuster;
   a chromophore; and
   an additive of chemical formula

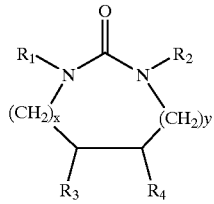

where each of $R_1$ and $R_2$ is independently selected from the group consisting of —$CH_2OH$, —$CH_2CH(OH)(CH_2)_{n1}CH_3$ wherein n1 is an integer from 1 to 5, —$CH_2CH(OH)(CH_2)_{n2}OH$ wherein n2 is an integer from 1 to 6, —$CH_2CH(OH)(CH_2)_{n3}NH_2$ wherein n3 is an integer from 1 to 6, wherein n4 is an integer from 1 to 10, —$CH_2CH(OH)(CH_2CH_2O)_{n5}CH_2CH_2OH$ wherein n5 is an integer from 1 to 10, —$CH_2CH(OH)(CH_2CH_2NH)_{n6}CH_2CH_2OH$ wherein n6 is an integer from 1 to 9, —$CH_2CH(OH)(CH_2CH(OH))_{n7}CH_2CH_2OH$ wherein n7 is an integer from 1 to 10, —$CH_2CH(OH)(CH_2CH(CN))_{n8}CH_2CH_2OH$ wherein n8 is an integer from 1 to 10, —$CH_2CH(OH)(CH_2CH(COONH_2))_{n9}CH_2CH_2OH$ wherein n9 is an integer from 1 to 10 or —$CH_2CH(OH)(CH_2CH(COO(CH_2)_mNH_2))_{n10}CH_2CH_2OH$ wherein n10 is an integer from 1 to 10, and m is an integer from 1 to 5;
where x and y are integers and $0 \leq x+y \leq 8$;
and where each of $R_3$ and $R_4$ is independently selected from the group consisting of —H, —$CH_3$, -$CH_2OH$, —$CH_2CH_2OH$, —$CH_2CH(OH)(CH_2)_{n1}CH_3$ wherein n1 is an integer from 1 to 5, —$CH_2CH(OH)(CH_2)_{n2}OH$ wherein n2 is an integer from 1 to 6, —$CH_2CH(OH)(CH_2)_{n3}NH_2$ wherein n3 is an integer from 1 to 6, —$CH_2CH_2O(CH_2CH_2O)_{n4}CH_2CH_2OH$ wherein n4 is an integer from 1 to 10, —$CH_2CH(OH)(CH_2CH_2O)_{n5}CH_2CH_2OH$ wherein n5 is an integer from 1 to 10, —$CH_2CH(OH)(CH_2CH_2NH)_{n6}CH_2CH_2OH$ wherein n6 is an integer from 1 to 9, —$CH_2CH(OH)(CH_2CH(OH))_{n7}CH_2CH_2OH$ wherein n7 is an integer from 1 to 10, —$CH_2CH(OH)(CH_2CH(CN))_{n8}CH_2CH_2OH$ wherein n8 is an integer from 1 to 10, —$CH_2CH(OH)(CH_2CH(COONH_2))_{n9}CH_2CH_2OH$ wherein n9 is an integer from 1 to 10 and —$CH_2CH(OH)(CH_2CH(COO(CH_2)_mNH_2))_{n10}CH_2CH_2OH$ wherein n10 is an integer from 1 to 10, and m is an integer from 1 to 5.

2. The ink composition of claim 1, with said additive being 1,3-bis(hydroxymethyl)-2-imidazolidinone.

3. The ink composition of claim 1, where x=0, y=0, and each of $R_1$ $R_2$, $R_3$ and $R_4$ is —$CH_2CH_2OH$.

4. The ink composition of claim 1, where x=0, y=0, and each of $R_1$ $R_2$, $R_3$ and $R_4$ is —$CH_2CH(OH)CH_2CH_2OH$.

5. The ink composition of claim 1, where x=0, y=0, each of $R_1$ and $R_2$ is —$CH_2CH_2OH$, and $R_4$ and $R_5$ are each —$CH_2CH(OH)(CH_2CH_2O)_2CH_2CH_2OH$.

6. The ink composition of claim 1, where x=0, y=0, each of $R_1$ and $R_2$ is —$CH_2CH_2OH$, and $R_3$ and $R_4$ are each —$CH_2CH(OH)CH_2CH_2NH$.

7. The ink composition of claim 1, with said solvent being water.

8. The ink composition of claim 7, with said co-solvent being selected from the group consisting of ethanol, isopropanol, butanol and pentanol.

9. The ink composition of claim 8, with said co-solvent being ethanol.

10. The ink composition of claim 1, with said humectant comprising a compound selected from the group consisting of glycerine, ethylene glycol, diethylene glycol, triethylene glycol, propylene glycol, dipropylene glycol, hexylene glycol, 1,3-butanediol, 1,5-pentanediol, 2-butene-1,4-diol and 2-methyl-2-pentanediol.

11. The ink composition of claim 1, with said surfactant being an alkylcarboxylic acid salt, an alkyl alcohol sulfonic acid ester salt, an alkyl sulfonate salt, or an alkylbenene sulfonate salt; and the surfactant molecule having in the range of 1 to 1000 carbon atoms.

12. The ink composition of claim 11, the surfactant molecule having in the range of 10 to 200 carbon atoms.

13. The ink composition of claim 1, with said surfactant being a polyoxytheylene alkyl ether, a polyoxyethylene alkylphenyl ether, a polyoxyethylene secondary alcohol ether, a polyoxyethylene-oxypropylene block copolymer, a polyglycerine fatty acid ester, or a sorbitan fatty acid ester; and the surfactant molecule having in the range of 1 to 1000 carbon atoms.

14. The ink composition of claim 13, with the surfactant molecule having in the range of 10 to 200 carbon atoms.

15. The ink composition of claim 1, with said viscosity adjuster being poly(vinyl alcohol), casein or carboxymethylcellulose.

16. The ink composition of claim 7, with the water being in the range of 34.0 to 97.6 weight-% of the ink composition, the co-solvent being in the range of 1.0 to 20% weight-%, the humectant being in the range of 0.1 to 20.0 weight-%, the surfactant being in the range of 0.1 to 10 weight-%, the viscosity adjuster being in the range of 0.1 to 5.0 weight-%, and the chromophore being in the range of 1.0 to 10.0 weight-%.

17. The ink composition of claim 1, with said additive being in the range of 0.1 to 10 weight-% of the ink composition.

18. The ink composition of claim 17, with said additive being in the range of 2.0 to 6.0 weight-% of the ink composition.

19. The ink composition of claim 16, with said additive being in the range of 0.1 to 10 weight-% of the ink composition.

20. The ink composition of claim 19, with said additive being in the range of 2.0 to 6.0 weight-% of the ink composition.

21. The ink composition of claim 16, with said humectant being in the range of 4 to 15 weight-% of the ink composition.

22. The ink composition of claim 16, with said surfactant being in the range of 3 to 6 weight-% of the ink composition.

23. The ink composition of claim 1, with said chromophore being a dye.

24. The ink composition of claim 1, with said chromophore being a pigment.

25. The ink composition of claim 23, with said chromophore being in the range of 1.0 to 10.0 weight-% of the ink composition.

26. The ink composition of claim 24, with said chromophore being in the range of 1.0 to 10.0 weight-% of the ink composition.

27. The ink composition of claim 24, with said chromophore being carbon black, graphite, vitreous carbon, activated charcoal, activated carbon, anthraquinone, phthalocyanine blue, phthalocyanine green, a diazo pigment, a monoazo pigment, a pyranthrone, perylene, quinacridone, or an indigoid pigment.

28. An ink composition, comprising:
water;
ethanol;
glycerine;
polyoxyethylene ethylether;
poly(vinyl alcohol); and
1,3-bis(hydroxymethyl)-2-imidazolidinone.

29. The ink composition of claim 28, further comprising:
C.I. Direct Black 168.

30. The ink composition of claim 29, with the water being in the range of 85.6 to 87.6 weight-% of the ink composition, the ethanol being 3.0 weight-%, the glycerine being 5.0 weight-%, the polyoxyethylene ethyl ether being 0.2 weight-%, the poly(vinyl alcohol) being 0.2 weight-%, the 1,3-bis(hydroxymethyl)-2-imidazolidinone being 1.0 weight-% and the C.I. Direct Black 168 being in the range of 1.0 to 3.0 weight-%.

31. The ink composition of claim 28, further comprising:
carbon black.

32. The ink composition of claim 31, with the water being in the range of 8 to 87.6 weight-% of the ink composition, the ethanol being 3.0 weight-%, the glycerine being weight-%, the polyoxyethylene ethyl ether being 0.2 weight-%, the poly(vinyl alcohol) being weight-%, the 1,3-bis(hydroxymethyl)-2-imidazolidinone being 1.0 weight-% and the carbon black being in the range of 1.0 to 3.0 weight-%.

33. An ink composition, comprising:
water;
ethanol;
glycerine;
polyoxyethylene ethylether;
poly(vinyl alcohol); and
an additive of chemical formula

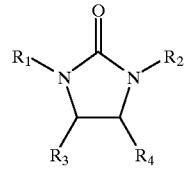

where each of $R_1$, $R_2$, $R_3$ and $R_4$ is independently selected from the group consisting of —$CH_2CH_2OH$, —$CH_2CH(OH)CH_2CH_2OH$, —$CH_2CH(OH)(CH_2CH_2O)_2CH_2CH_2OH$, and —$CH_2CH(OH)CH_2CH_2NH_2$.

34. The ink composition of claim 33, where each of $R_1$, $R_2$, $R_3$ and $R_4$ is —$CH_2CH_2OH$.

35. The ink composition of claim 33, where each of $R_1$, $R_2$, $R_3$ and $R_4$ is —$CH_2CH(OH)CH_2CH_2OH$.

36. The ink composition of claim 33, where each of $R_1$ and $R_2$ is —$CH_2CH_2OH$, and each of $R_3$ and $R_4$ is —$CH_2CH(OH)(CH_2CH_2O)_2CH_2CH_2OH$.

37. The ink composition of claim 33, where each of $R_1$ and $R_2$ is —$CH_2CH_2OH$, and each of $R_3$ and $R_4$ is —$CH_2CH(OH)(CH_2CH_2O)_2CH_2CH_2NH$.

38. A method of making an ink composition, comprising the steps of:

making an initial mixture of a solvent, a viscosity adjuster, a humectant, a surfactant and an additive of chemical formula

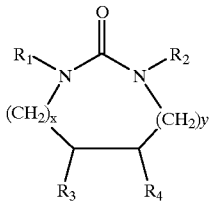

where each of $R_1$ and $R_2$ is independently selected from the group consisting of —$CH_2OH$, —$CH_2CH_2OH$, —$CH_2CH(OH)(CH_2)_{n1}CH_3$ wherein n1 is an integer from 1 to 5, —$CH_2CH(OH)(CH_2)_{n2}OH$ wherein n2 is an integer from 1 to 6, —$CH_2CH(OH)(CH_2)_{n3}NH_2$ wherein n3 is an integer from 1 to 6, —$CH_2CH_2O(CH_2CH_2O)_{n4}CH_2CH_2OH$ wherein n4 is an integer from 1 to 10, —$CH_2CH(OH)(CH_2CH_2O)_{n5}CH_2CH_2OH$ wherein n5 is an integer from 1 to 10, —$CH_2CH(OH)(CH_2CH_2NH)_{n6}CH_2CH_2OH$ wherein n6 is an integer from 1 to 9, —$CH_2CH(OH)(CH_2CH(OH))_{n7}CH_2CH_2OH$ wherein n7 is an integer from 1 to 10, —$CH_2CH(OH)(CH_2CH(CN))_{n8}CH_2CH_2OH$ wherein n8 is an integer from 1 to 10, —$CH_2CH(OH)(CH_2CH(COONH_2))_{n9}CH_2CH_2OH$ wherein n9 is an integer from 1 to 10 or —$CH_2CH(OH)(CH_2CH(COO(CH_2)_mNH_2))_{n10}CH_2CH_2OH$ wherein n10 is an integer from 1 to 10, and m is an integer from 1 to 5;

where x and y are integers and $0 \leq x+y \leq 8$;

and where each of $R_3$ and $R_4$ is independently selected from the group consisting of —H, —$CH_3$, —$CH_2OH$, —$CH_2CH_2OH$, —$CH_2CH(OH)(CH_2)_{n1}CH_3$ wherein n1 is an integer from 1 to 5, —$CH_2CH(OH)(CH_2)_{n2}OH$ wherein n2 is an integer from 1 to 6, —$CH_2CH(OH)(CH_2)_{n3}NH_2$ wherein n3 is an integer from 1 to 6, —$CH_2CH_2O(CH_2CH_2O)_{n4}CH_2CH_2OH$ wherein n4 is an integer from 1 to 10, —$CH_2CH(OH)(CH_2CH_2O)_{n5}CH_2CH_2OH$ wherein n5 is an integer from 1 to 10, —$CH_2CH(OH)(CH_2CH_2NH)_{n6}CH_2CH_2OH$ wherein n6 is an integer from 1 to 9, —$CH_2CH(OH)(CH_2CH(OH))_{n7}CH_2CH_2OH$ wherein n7 is an integer from 1 to 10, —$CH_2CH(OH)(CH_2CH(CN))_{n8}CH_2CH_2OH$ wherein n8 is an integer from 1 to 10, —$CH_2CH(OH)(CH_2CH(COONH_2))_{n9}CH_2CH_2OH$ wherein n9 is an integer from 1 to 10 and —$CH_2CH(OH)(CH_2CH(COO(CH_2)_mNH_2))_{n10}CH_2CH_2OH$ wherein n10 is an integer from 1 to 10, and m is an integer from 1 to 5;

stirring said initial mixture at a temperature in the range of 50 to 80° C. until the mixture is uniform;

then reducing the temperature of the mixture to a temperature in the range of 30 to 40° C.;

then adding a chromophore and a co-solvent to the reduced temperature mixture and stirring to yield a resultant mixture; and then filtering the resultant mixture to yield an ink composition.

39. The method of claim 38, with said step of stirring the initial mixture being performed at a temperature in the range of 60 to 70° C.

40. The method of claim 38, with said solvent being water and said co-solvent being ethanol.

41. The method of claim 38, with said additive being 1,3-bis(hydroxymethyl)-2-imidazolidinone.

42. The method of claim 38, with said additive being of chemical formula

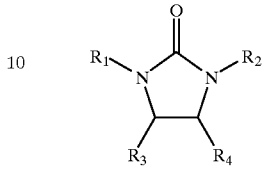

where each of $R_1$, $R_2$, $R_3$ and $R_4$ is independently selected from the group consisting of —$CH_2CH_2OH$, —$CH_2CH(OH)CH_2CH_2OH$, —$CH_2CH(OH)(CH_2CH_2O)_2CH_2CH_2OH$, and —$CH_2CH(OH)CH_2CH_2NH_2$.

43. An ink composition, comprising:

a solvent;

a co-solvent;

a humectant;

a surfactant;

a viscosity adjuster;

a chromophore; and an additive of chemical formula

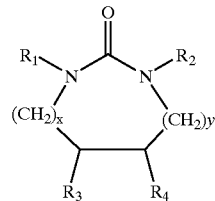

where each of $R_1$ and $R_2$ is independently selected from the group consisting of —$CH_2OH$, —$CH_2CH_2OH$, —$CH_2CH(OH)(CH_2)_{n1}CH_3$ wherein n1 is an integer from 1 to 5, —$CH_2CH(OH)(CH_2)_{n2}OH$ wherein n2 is an integer from 1 to 6, —$CH_2CH(OH)(CH_2)_{n3}NH_2$ wherein n3 is an integer from 1 to 6, —$CH_2CH_2O(CH_2CH_2O)_{n4}CH_2CH_2OH$ wherein n4 is an integer from 1 to 10, —$CH_2CH(OH)(CH_2CH_2O)_{n5}CH_2CH_2OH$ wherein n5 is an integer from 1 to 10, —$CH_2CH(OH)(CH_2CH_2NH)_{n6}CH_2CH_2OH$ wherein n6 is an integer from 1 to 9, —$CH_2CH(OH)(CH_2CH(OH))_{n7}CH_2CH_2OH$ wherein n7 is an integer from 1 to 10, —$CH_2CH(OH)(CH_2CH(CN))_{n8}CH)CH_2OH$ wherein n8 is an integer from 1 to 10, —$CH_2CH(OH)(CH_2CH(COONH_2))_{n9}CH_2CH_2OH$ wherein n9 is an integer from 1 to 10 or —$CH_2CH(OH)(CH_2CH(COO(CH_2)_mNH_2))_{n10}CH_2CH_2OH$ wherein n10 is an integer from 1 to 10, and m is an integer from 1 to 5;

where x and y are integers and;

and where each of $R_3$ and $R_4$ is independently selected from the group consisting of —H, —$CH_3$, —$CH_2OH$, —$CH_2CH_2OH$, —$CH_2CH(OH)(CH_2)_{n1}CH_3$ wherein n1 is an integer from 1 to 5, —$CH_2CH(OH)(CH_2)_{n2}OH$ wherein n2 is an integer from 1 to 6, —$CH_2CH(OH)(CH_2)_{n3}NH_2$ wherein n3 is an integer from 1 to 6, —$CH_2CH_2O(CH_2CH_2O)_{n4}CH_2CH_2OH$ wherein n4 is an integer from 1 to 10, —$CH_2CH(OH)(CH_2CH_2O)_{n5}CH_2CH_2OH$ wherein n5 is an integer from 1 to 10, —$CH_2CH(OH)(CH_2CH_2NH)_{n6}CH_2CH_2OH$ wherein n6 is an integer from 1 to 9, —$CH_2CH(OH)(CH_2CH(OH))_{n7}CH_2CH_2OH$ wherein n7 is an integer from 1 to 10, —$CH_2CH(OH)(CH_2CH(CN))_{n8}CH_2CH_2OH$ wherein n8 is an integer from 1 to 10, —$CH_2CH(OH)(CH_2CH(COONH_2))_{n9}CH_2CH_2OH$ wherein n9 is an integer from 1 to 10 and —$CH_2CH(OH)(CH_2CH(COO(CH_2)_mNH_2))_{n10}CH_2CH_2OH$ wherein n10 is an integer from 1 to 10, and m is an integer from 1 to 5, and at least one of $R_3$ and $R_4$ has a hydroxyl group.

\* \* \* \* \*